United States Patent
Zukerman et al.

(10) Patent No.: US 6,767,570 B2
(45) Date of Patent: Jul. 27, 2004

(54) PROCESS FOR PRODUCING READY-TO-EAT SHAPED RICE FOODS HAVING VISIBLE RICE GRAINS

(76) Inventors: Harold W Zukerman, 4125 W. Yorkshire La., Northbrook, IL (US) 60062; Rachel B. Zukerman, 4125 W. Yorkshire La., Northbrook, IL (US) 60062

( * ) Notice: Subject to any disclaimer, the term of this patent is extended or adjusted under 35 U.S.C. 154(b) by 241 days.

(21) Appl. No.: 10/144,306

(22) Filed: May 13, 2002

(65) Prior Publication Data

US 2003/0012860 A1 Jan. 16, 2003

Related U.S. Application Data

(63) Continuation-in-part of application No. 09/636,503, filed on Aug. 10, 2000, now abandoned.

(51) Int. Cl.⁷ ................................. A23L 1/182
(52) U.S. Cl. ................ 426/506; 426/509; 426/512; 426/523; 426/524; 426/618
(58) Field of Search ................ 426/506, 509, 426/512, 523, 524, 618

(56) References Cited

U.S. PATENT DOCUMENTS 4,764,390 A * 8/1988 Zukerman et al. .......... 426/438

* cited by examiner

Primary Examiner—Helen Pratt

(57) ABSTRACT

The present invention teaches a process for making ready-to-eat, shaped rice products having a texture comprised of visible, fully-cooked rice grains joined together; said process utilizes three rice-cooking steps. In the first rice-cooking step, the rice grains are only partially-cooked inside the cooker at temperatures above 175 F. The still-cooking, partially-cooked rice grains together with some adhering cooking water are discharged from the cooker before the centers of the grains are fully-cooked and while the grains are still flowable. In the second rice-cooking step, said rice grains continue to cook in an enclosed conveyor with their own retained heat and water at temperatures above 175 F while the retained water from the grains' surfaces is absorbed into their centers. An important aspect of the present invention is that the rice grains become fully-cooked at about the time they are formed into shaped units. In the third rice-cooking step, the shaped rice units comprised of visible, joined, fully-cooked rice grains are moved into fat fryers or hot-air ovens and are cooked at temperatures above 300 F to firm their textures and evaporate some of the grains' moisture before the fully-cooked grains become over-hydrated and burst.

19 Claims, No Drawings

US 6,767,570 B2

PROCESS FOR PRODUCING READY-TO-EAT SHAPED RICE FOODS HAVING VISIBLE RICE GRAINS

This application is a continuation-in-part of co-pending application Ser. No. 09/636,503, filed Aug. 10, 2000 now abandoned.

BACKGROUND OF THE INVENTION

The prior art teaches how to make shaped dry rice products such as dry rice noodles, dry rice chips, dry rice cakes, and dry puffed crisp rice particles. These shaped dry rice products are all made with finely milled rice flour and have moisture contents of about 10%. The prior art also teaches how to make RICE KRISPIES bars and granola bars which are comprised of puffed rice grains and/or low-density pieces of puffed crisp rice pieces that are joined to each other with a syrup binder.

U.S. Pat. No. 3,961,087 teaches the technology for preparing a frozen cooked rice product that has a portion of its amylose and amylopectin modified. Frozen shaped rice and other frozen grain products and the processes for preparing them have also been described in the prior art.

The USDA-ARS Food Research group at the Southern Regional Research Center Laboratories in New Orleans, La. teaches a procedure for making rice French fries by first milling dry rice grains into a fine flour, then blending the finely-milled dry rice flour with water and extruding the mixture through a high-shear, screw-type extruder.

U.S. Pat. No. 4,764,390 teaches how to make microwavable shaped rice products that are comprised of rice grains that are only partially cooked needing to be further cooked by the consumer in a microwave oven, which is one of the few heating appliances that can simultaneously cook both the centers of the individual partially-cooked rice grains while also properly re-heating the frozen units. Several heating appliances cannot be used to reheat the products made by the process taught in U.S. Pat. No. 4,764,390. For example, pop-up toasters cannot be used because they impart very hot radiant heat directly onto the frozen products' surfaces and would most likely burn the rice grains on the outer surfaces of the units before the partially-cooked rice grains located in the middle of the product become fully-cooked.

U.S. Pat. No. 3,711,295 teaches a process for making shaped rice products that have a "homogeneous-consistency" interior texture like French-fried potatoes.

U.S. Pat. No. 5,137,745 teaches a process for making shaped grain products comprised of visible, fully-cooked cereal grains of several different cereal grain genera such as corn, rye, wheat and oats all dispersed together in the same product. The most important feature of that patent is the unique multiple grain genera cooking process. The grains requiring the longest cooking time are added to the cooker first while the grains requiring the shortest cooking time are added to the cooker last. This patent also teaches the use of a cooling step to stop the grain-cooking process.

U.S. Pat. No. 6,103,283 teaches how to make a cereal and milk product that contains both the cereal and the fluid milk components in the same product. The products made by the process of U.S. Pat. No. 6,103,283 are completely different from the traditional cereal and milk breakfast which the consumer makes by soaking dry, puffed cereal pieces in an excess amount of refrigerated fluid milk and eating the resultant fluid mixture from a bowl with a spoon.

U.S. Pat. No. 5,525,366 teaches how to make a two-component frozen food product with an outer shell comprised of cereal grains surrounding its "non-grain" interior.

Most prior art cookbooks recommend cooking two pounds of water with each one pound of dry rice grains. Prior art cookbooks also warn against: a) cooking rice grains with too much water and also, b) cooking rice grains for too long because both the higher amount of absorbed water and the longer cooking time can cause the hot and still-cooking rice grains to absorb too much water and become over-hydrated and burst. The prior art also teaches that when shaped grain products are made and the grains are cooked with more than two pounds of water per pound of dry grains, and for too long a time without a cooling process to stop the cooking when the grains become fully cooked, the rice granules of the hot and still-cooking grains will absorb too much water and become overcooked and burst by the time the finished product is made.

The present invention teaches a process for making ready-to-eat, fully-cooked shaped rice products having an appearance of visible rice grains joined together; said process utilizes three separate rice-cooking steps. The shaped rice products of the present invention are fully-cooked and ready-to-eat. If they are frozen, they can be reheated from the freezer with any common kitchen heating appliance such as a pop-up toaster, toaster-oven, wok, broiler, conventional oven, convection-oven, grill, skillet, microwave, or fat-fryer.

BRIEF SUMMARY OF THE INVENTION

The present invention teaches a process for making fully-cooked shaped rice products comprised of visible rice grains joined together; said process utilizes three rice-cooking steps. In the first cooking step, the rice grains are only partially-cooked inside a cooker at temperatures above 175 F with between two and a half to four pounds of water per pound of dry rice grains. The still cooking, partially-cooked rice grains along with some adhering cooking water are discharged from the cooker before the centers of the grains become fully-cooked and while the grains are still flowable. In the second rice-cooking step, after the rice grains are discharged from the cooker, said grains continue to cook with their retained heat and moisture at temperatures above 175 F while the retained water from grains' surfaces is absorbed into their centers. An important aspect of the present invention is that the rice grains become fully-cooked at about the time they are formed into the shaped units. In the third rice-cooking step of the process, the shaped rice units comprised of visible, joined, fully-cooked rice grains are moved into fat fryers or hot air ovens and cooked at temperatures above 300 F to firm their textures and evaporate some of the grains' moisture before the fully-cooked grains become over-hydrated and burst.

It is an objective of the present invention to provide a process for making shaped rice products comprised of visible, joined, fully-cooked rice grains.

It is another object of the present invention to provide a process for preparing frozen shaped rice products that are fully-cooked and ready-to-eat. If the products are frozen, they can be reheated from the freezer with any common kitchen heating appliance such as a pop-up toaster, toaster-oven, wok, broiler, conventional oven, convection-oven, grill, skillet, microwave, or fat-fryer.

DETAILED DESCRIPTION OF THE PREFERRED EMBODIMENT

The present invention teaches a process for making ready-to-eat, fully-cooked shaped rice products having an appearance of visible rice grains joined together; said process utilizes three rice-cooking steps. In the first rice-cooking step, each pound of dry rice grains is cooked with about two and a half to four pounds of water inside either a batch or continuous cooker at temperatures above 175 F and preferably between about 190 F to 200 F. Food pieces, color, flavor ingredients, and starch complexing agents can also be added to and mixed with the cooking water inside the cooker. The food ingredients are dissolved into the water before the rice grains are added. The flavored cooking water is absorbed into the grains during the cooking process while the food pieces become uniformly dispersed with the cooking rice grains. It is important to select mixers that will blend the rice grains with the cooking water without mashing said grains. Cooking continues within the cooker until the most of the water is absorbed into the grains. The still-cooking partially-cooked rice grains, together with some adhering cooking water are discharged from the cooker before the centers of the grains become fully cooked and while said grains are still flowable.

In the present invention "rice grains" refer to either whole or broken grain rice selected from any one of the following classifications: long grain white rice, long grain brown rice, medium grain white rice, medium grain brown rice, short grain white rice, short grain brown rice, or waxy rice grains.

Food ingredients selected from the group consisting of food flavors, herbs, spices, rice starch, gums, starch complexing agents, salt, sugar, vegetable juices, fruit juices, fats, nutritional supplements, food colors, and combinations thereof can also be added to the cooking water in the cooker.

Food particles selected from the group consisting of diced or sliced vegetables, fruits, meats, poultry, fish, pasta and combinations thereof can also be added to the cooking water in the cooker.

In the second rice-cooking step the rice grains are discharged from the cooker onto a conveyor that moves the bed of the still-cooking rice grains to the shaping equipment. A conveyor that is enclosed is desirable because it allows the partially-cooked rice grains to continue cooking at temperatures above 175 F with their own retained heat and moisture. The still-cooking grains have to be cooked and conveyed to the shaping equipment in a manner that will not shear, mash or destroy the grains' visible rice grain appearance. As the partially-cooked rice grains are cooked at temperatures above 175 F on their way to the shaping equipment, said grains centers absorb some of the retained water from their surfaces as the grains become softer and more enlarged in size. An important aspect of the present invention is that the rice grain centers continue to slowly absorb some of the retained moisture from their surfaces and become fully-cooked at about the time said grains are formed into shaped rice units.

In the process of the present invention it is necessary to retain the visible cooked rice grains in the finished product texture. For that reason, it is important to select shaping equipment that will not excessively shear or mash the soft cooked rice grains while the units are formed. There are several shaping systems that are able to form the rice units' shape while still retaining the visible, rice grains in the units' texture.

One means of forming rectangular shaped rice units is by reducing the thickness of the sheet of the still-cooking rice grains to a desired thickness with bakery type sheeters and then cutting said rice sheet with cutters into individual units comprised of joined visible, rice grains. Bakery-type sheeters and cutters are well known in the art and readily available in the marketplace.

Another means of forming shaped rice products is by extrusion. Large diameter double-roll formers and piston pumps are examples of low-shear pumping systems that can be used for forming the rice shapes. Both of these low-shear pumping systems are able to deposit ribbons of fully-cooked, visible, joined rice grains without excessively mashing or shearing the rice grain structures. Then guillotine cutters can be used to cut the rice ribbons into units. These extrusion systems and cutters are well known in the art and readily available in the marketplace.

Rice cups are made by first reducing the thickness of the bed of the still-cooking rice grains. Cup-shaped cavities are formed when a die having the shape of the cups' cavity is inserted into the rice sheet. The rice sheet with cup shaped cavities is then cut into units comprised of joined visible, rice grains. If the rice is sticky, the dies can be pre-coated with a vegetable oil or a non-stick sheet of flexible material can be inserted between the dies and the sheet of rice. The dies and cutters are readily available in the market place.

Another way to form rice grains into shaped rice units is by depositing the still-cooking rice grains in a mold which is then pressed into the desired shape with a die. Dies and molds that form product shapes are readily available in the marketplace.

In the third rice cooking step, the rice units comprised of visible, joined, fully-cooked rice grains are moved into fat fryers or hot air ovens to further cook the units at temperatures above 300 F to firm their textures and evaporate some of the grains' moisture before the fully-cooked grains become over-hydrated and burst. Instead of the water absorbing from the surface to the still-cooking rice grains' centers, said water is entirely removed out of the grains. There are several methods for rapidly evaporating water from the units' grains. One way is to cook the units with hot air at temperatures above 300 F and preferably around 400 F. A second way to cook the units is by fat-frying at temperatures above 300 F and preferably around 375 F–400 F. These fully-cooked shaped rice products are now ready-to-eat. However, in a preferred embodiment, the shaped rice products can be rapidly frozen to below 0 F and stored frozen. Freezing can be done with cold air, liquid nitrogen or carbon dioxide. Freezers suitable for this operation are well-known and commercially available.

The following three examples will further illustrate the invention, but it is not intended that the invention be limited to the details set forth there:

EXAMPLE 1

Formula: Fat-Fried, Salsa Flavored Rice Finger-Foods

| Ingredients | Per Cent (By Weight) |
| --- | --- |
| Long grain white rice | 21.5 |
| Water | 57.5 |
| Chunky salsa sauce | 10.8 |
| Diced red pepper | 4.5 |
| Diced onions | 2.6 |
| Margarine | 1.5 |
| Salt | 1.0 |
| Flavor | 0.2 |
| Color | 0.2 |
| Monoglycerides | 0.2 |
| Total | 100.0 |

Note: The formula does not reflect moisture and fat changes during processing.

Process: Fat-Fried, Salsa-Flavored Rice Finger Foods

In this example, rice is cooked in flavored cooking water inside a continuous cooker equipped with non-shear scraper mixers. The water and the rice grains are metered into the continuous cooker. The flavor and vegetable pieces are also metered into the cooking water while the rice grains are cooked at about 200 F. Before they become fully-cooked, the flavored rice grains together with some adhering cooking water are discharged from the continuous cooker onto a moving conveyor belt. The hot partially-cooked rice grains are then moved to the forming equipment while said grains continue to cook at temperatures above 175 F. The grain cooking is controlled in a manner whereby the grain centers become fully-cooked, soft and wet with the retained water from the grains surfaces at about the same time said grains are formed into the shaped rice units with double-roll formers and guillotine cutters. Both the formers and cutters are well-known in the art and readily available in the marketplace. The flavored shaped rice units are then fat-fried at about 400 F for about 60 seconds to firm the texture of the units and to stop the further absorption of water from the grains' surfaces to their centers. The rice units are then frozen to below 0 F.

EXAMPLE 2

Formula: Oven-Baked Rice Grains and Mixed-Vegetable Finger-Foods

| Ingredients | Per Cent (By Weight) |
| --- | --- |
| Water | 54.0 |
| Long Grain White Rice | 20.0 |
| Diced Red Pepper | 4.3 |
| Diced Carrots | 4.3 |
| Diced Green Beans | 3.2 |
| Corn | 3.2 |
| Diced Green Pepper | 2.2 |
| Diced Onions | 2.0 |
| Waxy Rice Flour | 1.5 |
| Margarine | 1.5 |
| Spices and Flavors | 1.3 |
| Vegetable Flavors | 1.0 |
| Salt | 1.0 |
| Dextrose | 0.3 |
| Monoglycerides | 0.2 |
| Total | 100.0 |

Note: This formula does not reflect moisture and fat changes during processing.

Process: Oven-Baked Rice Grains and Mixed-Vegetable Finger-Foods

In this example the flavored water, diced vegetables and rice grains are cooked together at 200 F in a tilt-type batch-cooker equipped with non-shear scraper mixers. When most of the cooking water has absorbed into the surfaces of the still-cooking rice grains, said partially-cooked rice grains with their adhering cooking water are dumped from the tilt-type batch-cooker onto a moving conveyor belt where said grains accumulate as a thick uniform sheet of individual, visible rice grains. As the hot rice grains are conveyed from the batch cooker to the forming equipment, the centers of the grains continue to cook at temperatures above 175 F. The grains' centers become fully-cooked, soft and wet with the retained water from the grains surfaces at about the time said grains are formed into the shaped rice units by the following technique. The sheet of still-cooking rice grains is reduced to ¾ inch thickness with bakery sheeting rolls. Rotary cutters then cut said rice sheet into continuous ribbons of joined visible rice grains. Guillotine cutters cut said ribbons into units which are then cooked in an oven with hot air at about 325 F until the units' texture firms. The ribbon units are then frozen and stored frozen.

EXAMPLE 3

Formula: Oven-Baked Rice Cups

| Ingredients | Per Cent (By Weight) |
| --- | --- |
| Water | 65.0 |
| Long Grain White Rice | 20.0 |
| Diced Red pepper | 4.0 |
| Diced Green pepper | 2.2 |
| Diced Onions | 1.0 |
| Flavors | 2.5 |
| Margarine. | 2.5 |
| Waxy Rice Flour | 1.0 |
| Salt | 1.0 |
| Sugar | 0.6 |
| Monoglycerides | 0.2 |
| Total | 100.0 |

Note: This formula does not reflect moisture and fat changes during processing.

Process: Oven-Baked Rice Cups

In this example, rice is cooked in flavored cooking water inside a tilt-type batch-cooker equipped with non-shear scraper mixers. The flavor and the vegetable pieces are added to the cooking water while the rice grains are cooking at 200 F. When most of the cooking water has absorbed into the rice grains, the mixture of diced vegetables and rice grains, whose centers are not fully-cooked and whose surfaces have some adhering cooking water, are dumped from the tilt-type batch cooker onto a moving conveyor belt. As the bed of hot rice grains are moved to the forming equipment they continue to cook at about 200 F. The grain-cooking is controlled in a manner whereby the grains' centers become fully-cooked, soft and wet with the retained water from the grains surfaces at about the time said grains are formed into the shaped rice units by the following procedure. The thickness of the bed of hot, joined, cooked rice grains is reduced with a roll sheeter to about 2 inches thick. Rectangular cup-shaped units are made by first inserting the cavity-forming die into the sheet of still-cooking rice grains. If the rice is sticky, a thin flexible sheet of non-stick material is inserted between the die and the rice when the cavity shape is formed. Cutters are then used to subdivide the rice sheet into individual rice cups which are then cooked in an oven with hot air at about 325 F until the units' texture firms. The cup-shaped units are then frozen and stored frozen.

It is understood that the above described process and the above examples are simply illustrative of the application of principles of the invention and many other modifications may be made without departing from the spirit and scope of the invention.

We claim:

1. A process for making shaped rice foods comprised of visible, joined, fully-cooked rice grains by a process comprising:

a) partially cooking dry rice grains with water at temperatures above 175 F in a cooker and discharging the hot and still-cooking grains with adhering cooking water from said cooker while said grains are still flowable;

b) further cooking the grains of a) at temperatures above 175 F whereby the centers of the grains absorb some of said grains' surface water and become fully-cooked as they are formed into shaped units comprised of visible, fully-cooked rice grains; and c) still further cooking the rice units of b) at temperatures above 300 F to firm their texture and evaporate some of the grains moisture before the fully-cooked grains become over-hydrated and burst.

2. The process of claim 1 wherein the cooker is equipped with mixers and the mixers of the cooker blend the rice grains with the cooking water without mashing the individual rice grains.

3. The process of claim 1 wherein the rice grains are selected from the group consisting of broken grain white rice, broken grain brown rice, long grain white rice, long grain brown rice, medium grain white rice, medium grain brown rice, short grain white rice, short grain brown rice, or waxy rice grains.

4. The process of claim 1 wherein two and a half to four pounds of water are cooked together with each one pound of dry rice grains.

5. The process of claim 1 which further comprises adding to the cooking water, food ingredients selected from the group consisting of food flavors, herbs, spices, rice starch, gums, starch complexing agents, salt, sugar, vegetable juices, fruit juices, fats, nutritional supplements, food colors, and combinations thereof.

6. The process of claim 1 which further comprises adding to the cooking water, food pieces selected from the group consisting of: vegetables, fruits, meats, poultry, fish, pasta, and combinations thereof.

7. The process of claim 1 whereby the partially-cooked visible rice grains with some adhering surface cooking water are cooked at temperatures above 175 F as they are conveyed to the shaping equipment.

8. The process of claim 7 whereby the partially-cooked visible rice grains are cooked with their own retained heat and water as they are conveyed to the shaping equipment.

9. The process of claim 7 whereby the partially-cooked visible rice grains are cooked with their own retained heat and water in an enclosed conveyor as they are moved to the shaping equipment.

10. The process of claim 7 whereby the visible rice grains are not destroyed as they are cooked and conveyed to the shaping equipment.

11. The process of claim 7 whereby the water from the surface of the rice grains is absorbed into said grains' centers.

12. The process of claim 1 whereby the centers of the partially-cooked rice grains become fully-cooked at about the time the grains are compressed to a desired thickness with bakery type sheeters and cut into units comprised of joined visible rice grains.

13. The process of claim 1 whereby the centers of the partially cooked rice become fully-cooked at about the time said grains are formed into continuous ribbons comprised of joined visible, rice grains with double roll formers and then cut into units.

14. The process of claim 1 whereby the centers of the partially cooked rice grains become fully-cooked at about the time said grains are formed with dies and molds into cup-like shaped units comprised of joined visible, rice grains.

15. The process of claim 14 wherein a thin flexible sheet of non-stick material is inserted between the hot rice grains and the dies and molds while the cavity shape of the rice cup is formed.

16. The process of claim 1 wherein the rice units comprised of joined visible, rice grains are cooked with hot fat at temperatures above 300 F to firm their texture and evaporate some of the grains' moisture before the fully-cooked grains become over-cooked and burst.

17. The process of claim 16, which further comprises the step of rapidly freezing the fat-fried shaped rice units comprised of joined, visible rice grains.

18. The process of claim 1 wherein the rice units comprised of joined visible, rice grains are cooked with hot air at temperatures above 300 F in an oven to firm their texture and evaporate some of the grains moisture before the fully-cooked grains become over-cooked and burst.

19. The process of claim 18, which further comprises the step of rapidly freezing the oven-baked shaped rice units comprised of joined, visible rice grains.

* * * * *